US008761400B2

(12) United States Patent
Benedikt

(10) Patent No.: US 8,761,400 B2
(45) Date of Patent: Jun. 24, 2014

(54) HARDWARE LINKED PRODUCT KEY

(75) Inventor: Mark L. Benedikt, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1546 days.

(21) Appl. No.: 11/182,460

(22) Filed: Jul. 15, 2005

(65) Prior Publication Data

US 2007/0014414 A1    Jan. 18, 2007

(51) Int. Cl.
*H04L 29/06* (2006.01)

(52) U.S. Cl.
USPC ............................................... 380/278

(58) Field of Classification Search
USPC ................................. 380/259, 278
See application file for complete search history.

(56) References Cited

U.S. PATENT DOCUMENTS

| 5,903,650 | A  | * | 5/1999  | Ross et al.      | 705/59  |
|-----------|----|---|---------|------------------|---------|
| 6,169,976 | B1 | * | 1/2001  | Colosso          | 705/59  |
| 7,318,235 | B2 | * | 1/2008  | Grawrock         | 726/26  |
| 7,454,622 | B2 | * | 11/2008 | Laidlaw et al.   | 713/182 |
| 2001/0034712 | A1 | * | 10/2001 | Colvin        | 705/52  |
| 2002/0104019 | A1 | * | 8/2002  | Chatani et al. | 713/201 |
| 2002/0162104 | A1 | * | 10/2002 | Raike et al.   | 725/31  |
| 2003/0165241 | A1 | * | 9/2003  | Fransdonk      | 380/258 |
| 2004/0039705 | A1 | * | 2/2004  | Svancarek et al. | 705/51 |
| 2004/0117625 | A1 | * | 6/2004  | Grawrock       | 713/168 |
| 2004/0255292 | A1 |   | 12/2004 | Benedikt       |         |
| 2005/0021962 | A1 |   | 1/2005  | Benedikt       |         |
| 2006/0129848 | A1 | * | 6/2006  | Paksoy et al.  | 713/193 |

* cited by examiner

*Primary Examiner* — Michael S McNally
(74) *Attorney, Agent, or Firm* — Patricia Sellers; Sade Fashokun; Micky Minhas

(57) ABSTRACT

Software piracy is inhibited by distributing unique software product keys operable in hardware or a hardware linked device. Software operable on the hardware requires the presence of the key in or accessible via the hardware, and operates only if the hardware product key is present. A method for securing software includes the steps of: providing a plurality of unique product activation keys designed for access by a computer program and delivering the keys to a hardware manufacturer. The computer program seeks at least one of said plurality of unique product activation keys in the read only memory device.

10 Claims, 7 Drawing Sheets

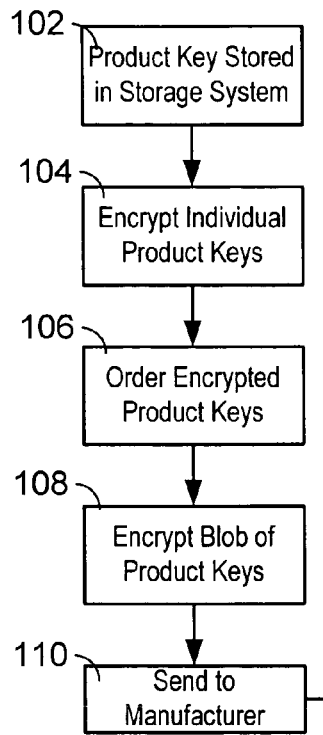
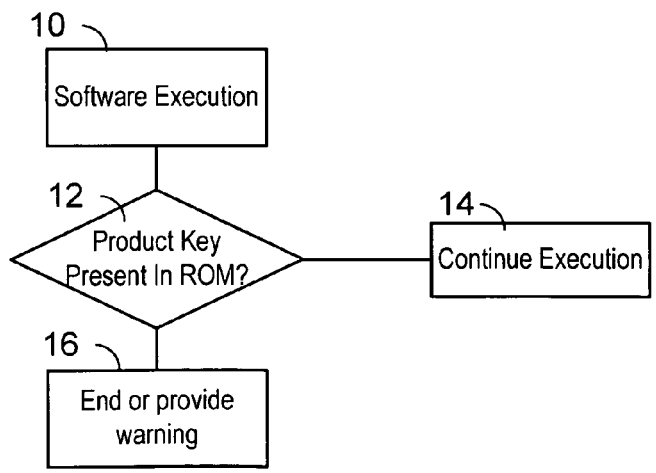
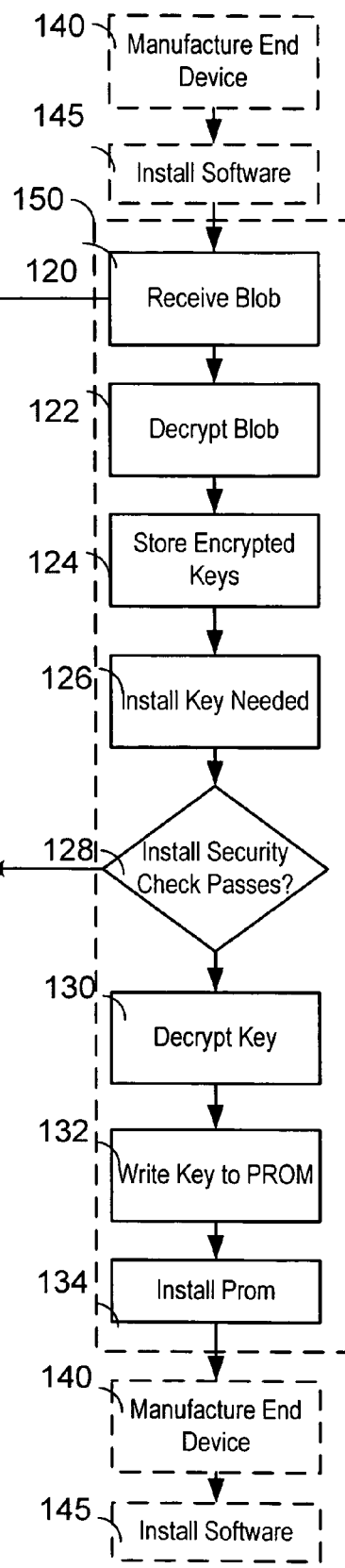

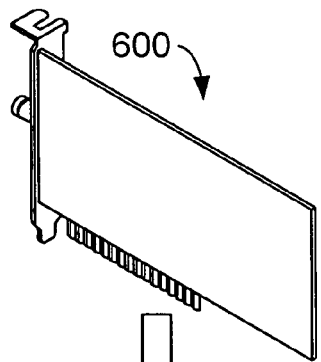
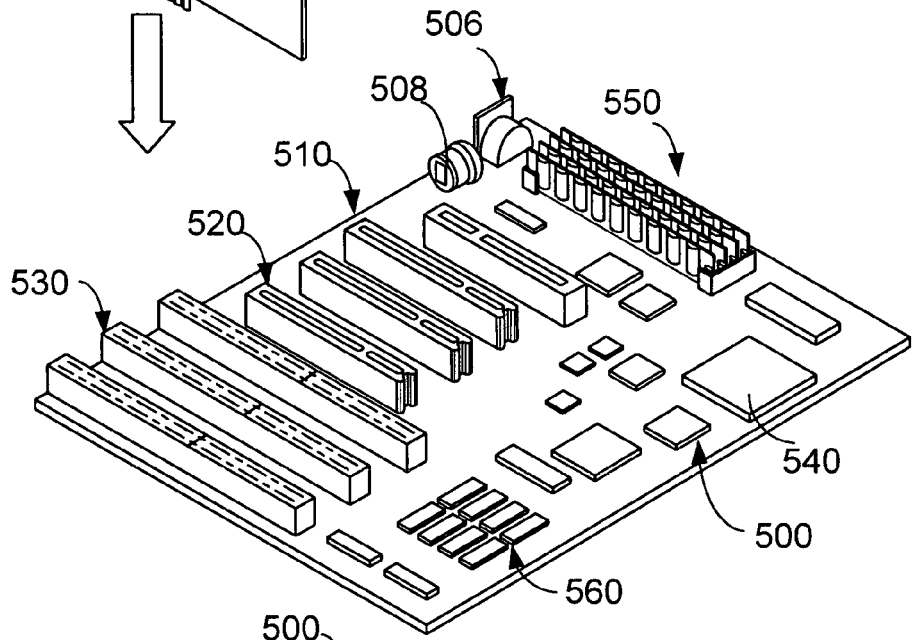
FIG. 5
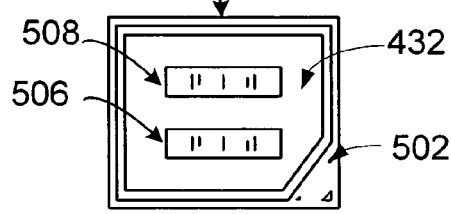
FIG. 6
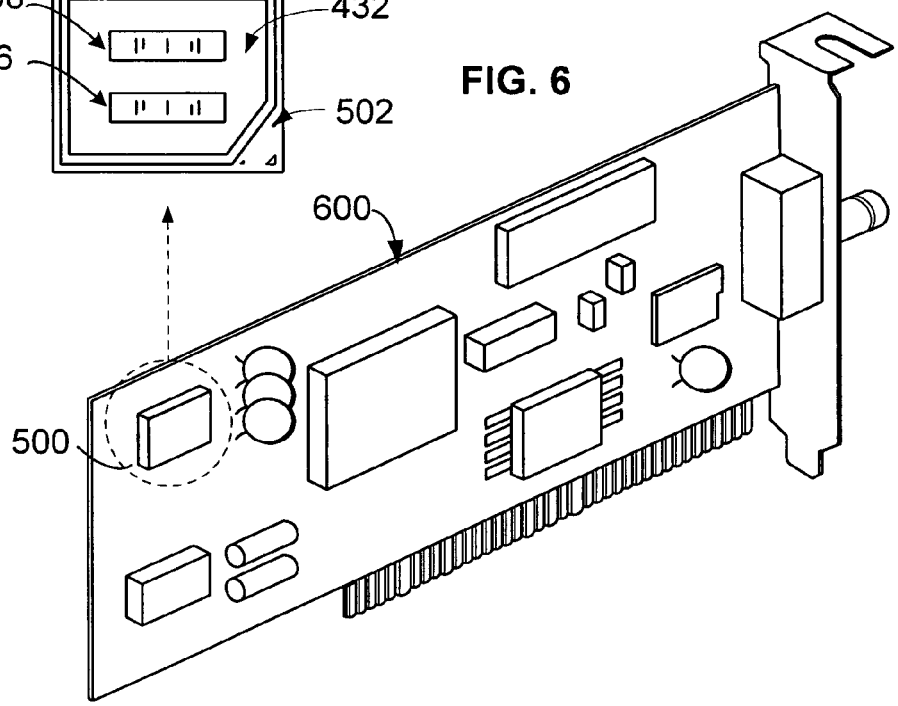

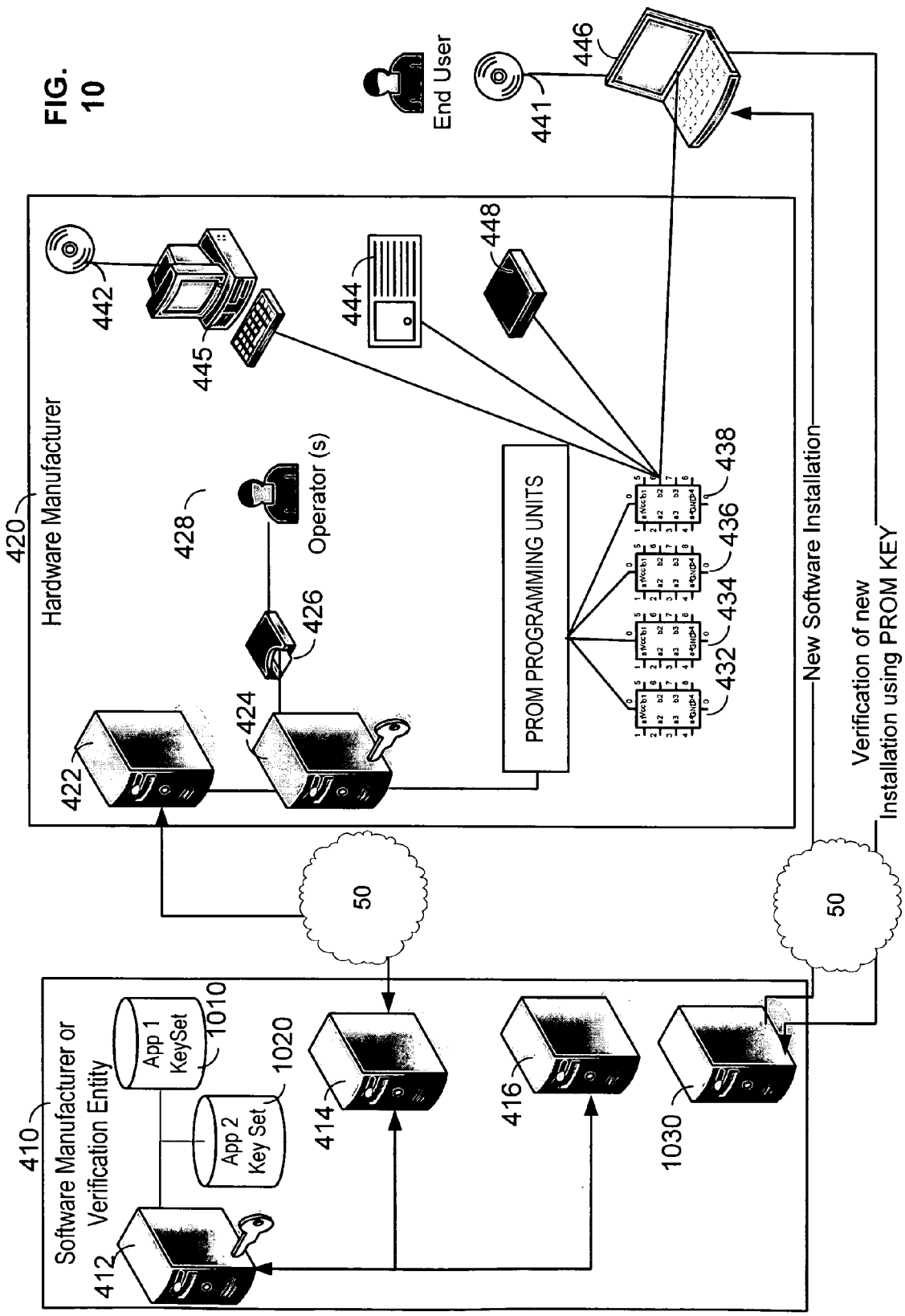

HARDWARE LINKED PRODUCT KEY

BACKGROUND

Description of the Related Art

Most software applications, as well as other digital content, are delivered on mass-produced optical media. Accompanying the media is an installation key that the user must manually enter during the installation process. The installation key is typically printed on a label and/or placed on printed material accompanying the media. Often, a label is also placed on the case enclosing the media. Incorrectly entering the installation key is interpreted as an invalid installation key and the installation process is aborted. If the installation key is genuine, and if the user correctly enters the installation key, the installation process continues with installing the computer software.

In some cases, installation keys are encrypted tokens. The installation program decrypts the manually entered installation key. If the decryption process generates information containing a recognized pattern, the installation process is allowed to continue. Thus, it is essential that the installation key be properly entered.

In other cases, the installation key is used during a product activation sequence. During product activation, the software application generally hashes hardware serial numbers and the aforementioned installation key specific to the product's license (a product key) to generate a unique activation ID. The activation ID, along with the product key, is sent to the manufacturer to verify the authenticity of the product key and determine that the product key is not being used for multiple installations.

Product keys that are currently used are relatively weak in terms of their ability to be hacked or otherwise broken. Counterfeit key generators, capable of generating apparently authentic installation keys, are readily available on the Internet. Using these counterfeit key generators, current computer systems have the processing power to generate several counterfeit installation keys within a matter of a few hours.

Another technique utilized by software manufacturer's to protect a software installation is to require the presence of a specific string of text in computer hardware to enable system software. For example, operating system manufacturers can require their OS to search for a specific string of text in a computer's basic input/output system (BIOS) stored in a flashable memory before enabling an operating system boot process. The text generally sought is the same for all hardware provided by the manufacturer. For example, all on all IBM® computers, the software may search for the text string "IBM" before enabling the operating system, thereby ensuring that the image cannot be used on hardware from another manufacturer. However, this solution is also easily circumvented, as tools exist to flash (or re-write) a computer BIOS with the text or string sought by the software.

SUMMARY

Software piracy is inhibited by distributing unique software product keys operable in hardware or a hardware linked device. Software operable on the hardware requires the presence of the key in, or accessible via, the hardware, and operates only if the hardware product key is present. In one implementation, a programmable read only memory (PROM) in the hardware enables installation of a new data string into the hardware of an OEM solution on an on-the-fly basis during final assembly of the hardware, and in an electronic or Internet delivery of software to an end customer.

In one aspect, the invention is a method for securing software in a hardware device. The method may include the steps of: providing a plurality of unique product activation keys designed for access by a computer program and delivering the keys to a hardware manufacturer. The computer program seeks at least one of said plurality of unique product activation keys in a read only memory device.

In another embodiment, the invention is a method of securing software operable on a processing device. The method includes the steps of: receiving a plurality of unique product activation keys designed for access by a computer program in a specifically designated memory device accessible in a processing device; and installing the keys in a read only memory device in a hardware apparatus.

In yet another embodiment, the invention includes a method for securing a software installation in a hardware device. The method includes distributing a plurality of unique product keys to a hardware device manufacturer; and supplying the hardware manufacturer with executable software fully operable only when one of the unique product keys associated with the software is accessible to the software via a read only memory coupled to the hardware device.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a flow chart illustrating a method of using product keys as described herein.

FIG. 2 is a flow chart illustrating a delivery method for product keys as described herein.

FIG. 5 illustrates a motherboard of a processing device such as that shown in FIG. 4.

FIG. 6 illustrates a peripheral card configured in accordance with the present invention.

FIG. 10 illustrates alternative systems utilized by a software manufacturer and a hardware manufacturer in accordance with the present invention.

DETAILED DESCRIPTION

The invention inhibits software piracy by distributing a unique data string in the form of a software product key operable in hardware or a hardware linked device thereby forming the basis for a perpetual license of the software. The end user of a hardware device has a software image that is "pre-keyed" to the hardware, and operates only if the hardware product key is present. Specifically, a programmable read only memory (PROM) in the hardware enables installation of a new data string into the hardware of an OEM solution (or subsequent end user installation). In an OEM solution, installation of the data string occurs after decryption of the string in on an on-the-fly basis during final assembly of the hardware.

FIG. 1 is a flowchart illustrating a first method of the present invention. In general, a software manufacturer provides a series of valid product keys to a hardware manufacturer. The hardware manufacturer integrates the product keys into a hardware component which is addressable by software manufactured by the software manufacturer. When software from the software manufacturer is used in conjunction with the product of the hardware manufacturer, the software executes at step 10 and checks at step 12 whether the product key is present in a ROM device integrated with the hardware. If so, the application continues executing at step 14. If not, the application ends 16 or impellents a "not-found" process. The process of steps 10 and 14 may be an installation process or normal execution of the software during run-time. The not found process can be a program termination, a warning to the user to contract the hardware or software manufacturer, limited functionality (in terms of features or time) for the software, or any similar process.

Figure 3:
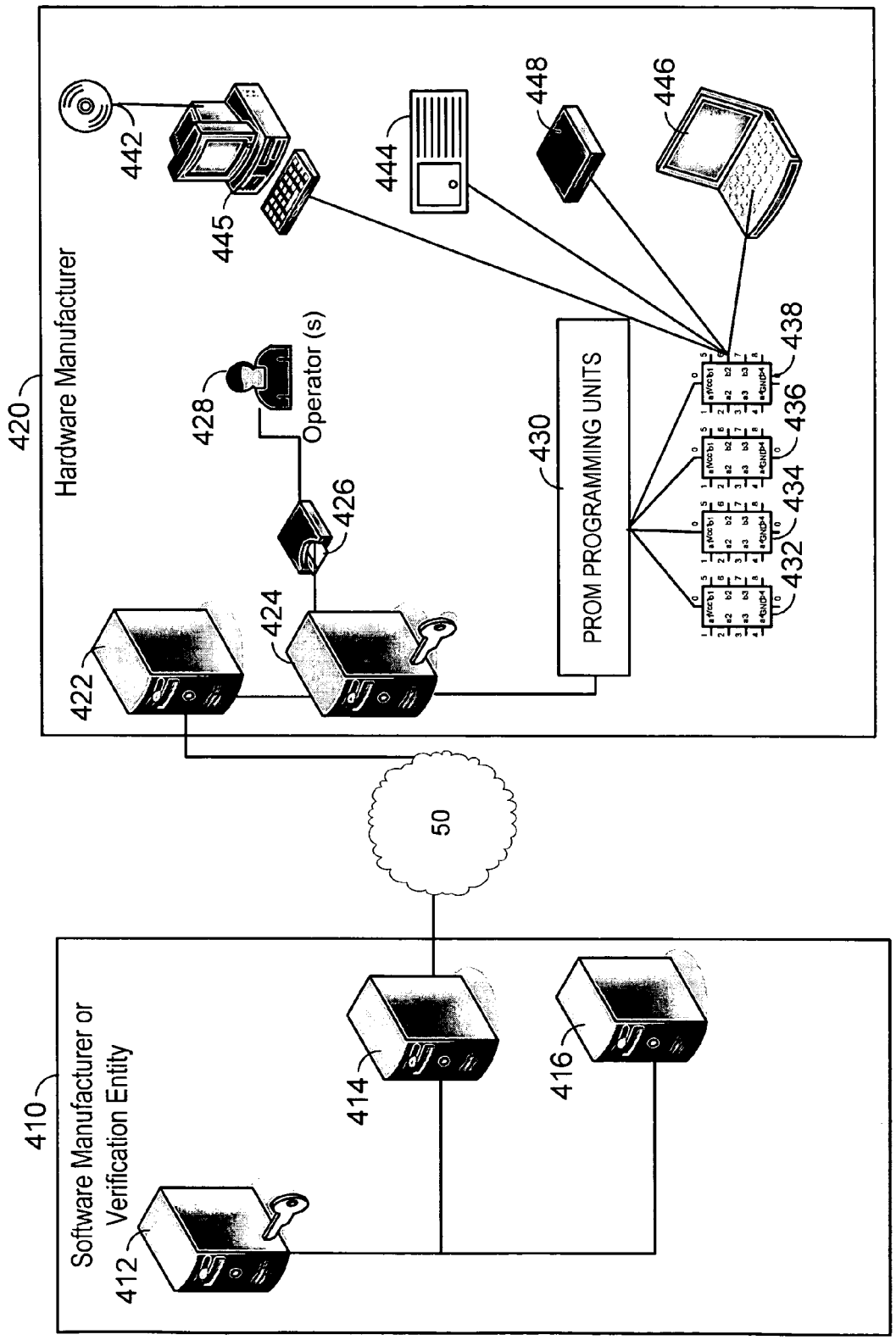
FIG. 3 illustrates systems utilized by a software manufacturer and a hardware manufacturer in accordance with the present invention.

FIG. 2 is a flowchart illustrating the method of the present invention. FIG. 2 will be described in relation to FIG. 3 which illustrates two entities which would perform the steps shown in FIG. 2. FIG. 3 shows a software manufacturing entity 410 and a hardware manufacturing entity 420. The software manufacturing entity 410 may comprise, for example, a volume manufacturer of application or operating system software which seeks to prevent piracy of its software applications. A typical hardware manufacturer 420 may be a computer manufacturer, a computer component manufacturer, a peripheral device manufacturer, a computer accessory device manufacturer or the like.

In FIG. 2, at step 102, a set of product keys suitable for enabling the software are maintained by the software manufacturer 410. The format of the product keys can be any of the key types presently used by manufacturers, including the so-called five-by-five string of alpha and numeric characters utilized for Microsoft® software. Alternatively, the product key can be a digital certificate such as an International Telecommunications Union (ITU) X.509 standard certificate. Still further, the product keys can be unique for every individual hardware device or may be unique over a set of hardware devices of the same type or from the same manufacturer.

In one embodiment, (shown in FIG. 3) the keys may be stored on a secure key server 412 within the control of the software manufacturer 410. At step 104, each of the individual product keys is encrypted using an encryption technique. Any form of symmetric or asymmetric encryption may be used; examples include DES, 1-DES, RC4, RC5, for symmetric encryption and RSA or Elliptic Curve Cryptography (ECC) for asymmetric encryption.

Next, at step 106, the encrypted keys are gathered into a key blob and ordered for distribution to one or more manufacturers. A blob generally refers to a Binary Large Object, which is a collection of binary data stored as a single entity, typically in a database management system. In one embodiment, each manufacturer may be sent an individualized blob of keys. In an alternative embodiment, manufacturers may be sent the same blob of keys. Next, the blob of keys is itself encrypted at step 108. Again, any form of symmetric or asymmetric encryption can be used. Once encrypted, the blob is sent to one or more hardware manufacturers at step 110. Encrypted key blobs can be placed on one or more staging servers, 414, 416, shown in FIG. 4, which store the encrypted blobs until ready for transmission via a network 50, such as the internet, to the hardware manufacturer 420. Transmission to the hardware manufacturer 420 may occur by any of a number of well known mechanisms, including but not limited to email, FTP, or by storing the keys on a secure media device (CDROM or other optical or flash media) which is sent by a land based carrier to the hardware manufacturer.

Process 150 illustrates the steps a hardware manufacturer performs with the key blob received from the software manufacturer 410. It will be noted that these steps 150 can be performed following a hardware manufacturing process 140 and software installation process 145, or before the hardware manufacturing process 140 and software installation process 145. Alternatively, the software installation process 145 need not be performed by the hardware manufacturer but may be performed by an end user.

At step 120, the hardware manufacturer will receive the encrypted key blob. If the blob is provided via network 50, they may be received by a main server 422. Main server 422 may include an FTP client or email server suitable for receiving the keys via network 50. Next, the blob is decrypted at step 122. Main server 422 may be used to perform decryption of the blob. Optionally, the individually encrypted keys may be stored at step 124 in, for example, a data structure on the main server 422 until ready for use.

When an installation key is needed at step 126, one or more security checks at the manufacturer may be implemented to ensure there is no misuse of the product keys. The installation checks illustrated at step 128 may be performed before decryption of individual product keys occurs on a product key distribution server 424. Installation security checks can include requiring one or more operators 428 to use an encrypted smart card 420 or biometric security reader to verify access to the product keys in a one-man or two man verification process. If the security checks pass, one or more keys are decrypted by, for example, product key server 424. Keys are then written to the read only memory device at 132 by one or more programming units 430 which program one or more memory devices 432, 434, 436, 438. It will be understood that the memory devices need only be of sufficient size to store one product key, or may store multiple product keys. The written devices 432, 434, 436, 438 are installed in a hardware device at 134.

Figure 4:
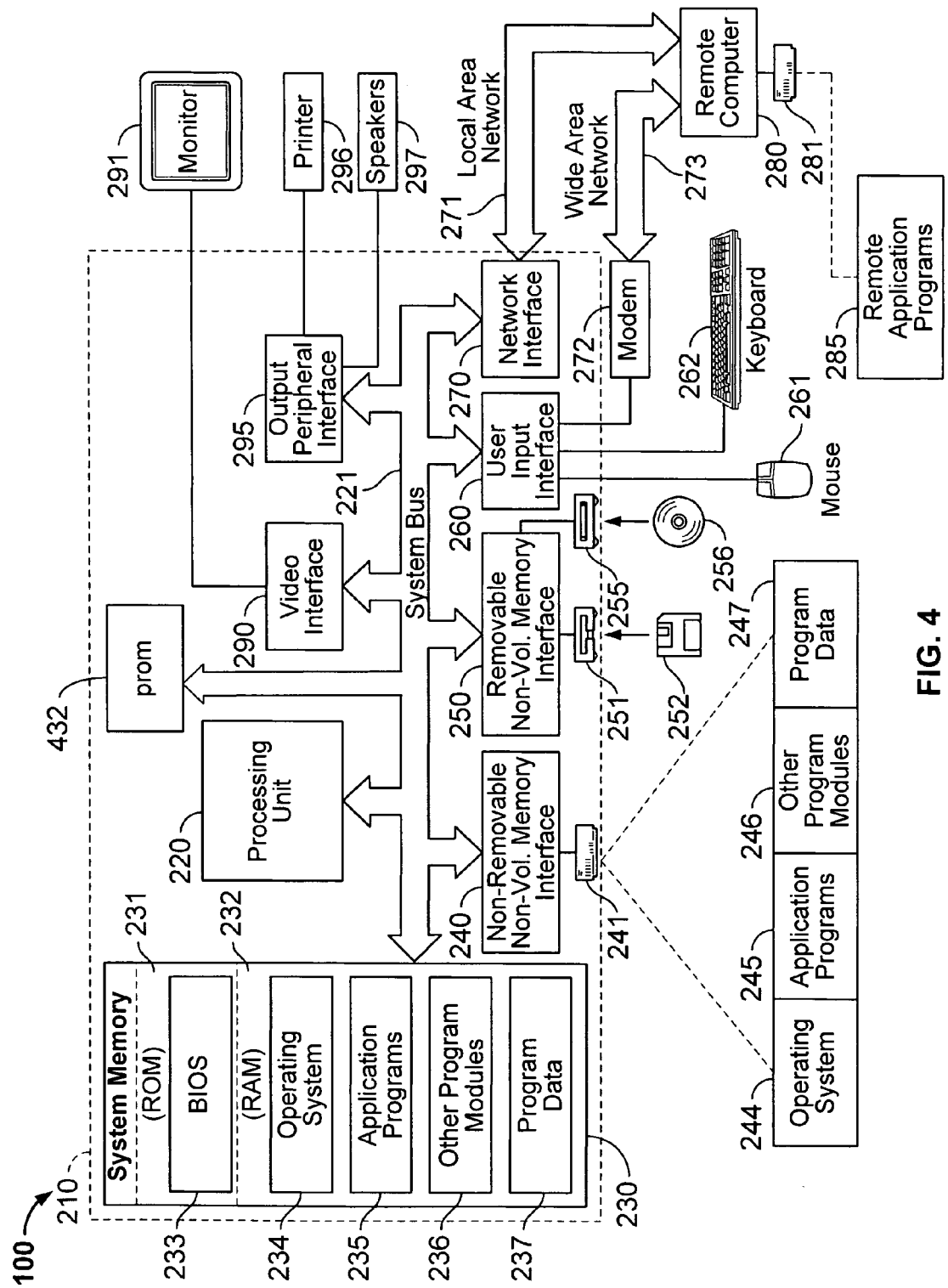
FIG. 4 depicts a processing device suitable for implementing the present invention.

It will be noted that the product keys remain individually encrypted until needed, and hence in the system shown in FIG. 4, the keys are only in the clear on the communication bus between the product key server 424 and the physical writing device 430. It will be further understood that the memory devices 432, 434, 436, 438 may be any of a number of types of read only memory, including programmable read only memory devices, electrically programmable read only memory devices, electrically erasable programmable read only memory devices, using various memory device technologies.

It will also be understood that a certain percentage of the product keys written to PROMs will be written to PROM devices that fail for one reason or another. Any key which cannot be written to a PROM device may be forwarded to a product activation clearinghouse for blocking.

Figure 9:
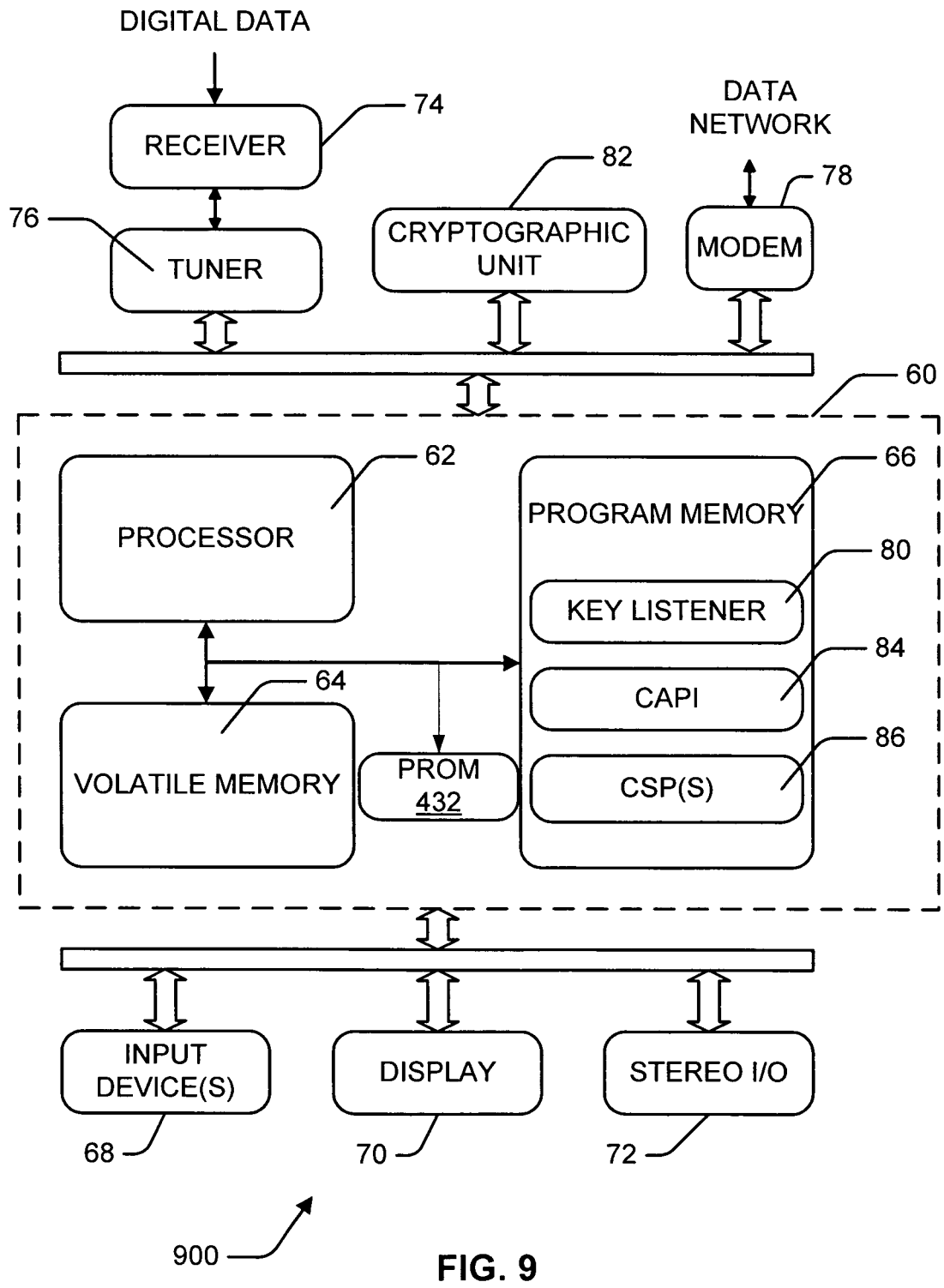
FIG. 9 illustrates an alternative processing device suitable for use with the methods described herein.

Any number of types of hardware devices may be used in accordance with the present invention. In one embodiment, the hardware is a personal computer or other type of processing device. FIGS. 4 and 9 illustrate suitable processing devices which can implement the method of FIGS. 1 and 2.

FIG. 4 illustrates an example of a suitable computing system environment 100 which in one embodiment may comprise a personal computer or server as discussed in the various embodiments herein. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Also shown coupled to system bus 121 is a PROM device 432. PROM device 432 includes the product key or keys allowing the application programs, operating system or other program modules to execute in accordance with FIG. 1. As indicated above, the PROM device may be installed in the processing devices of FIG. 4 during manufacture of the processing device or other components of the device FIG. 5 shows a motherboard of some of the components making up the computing system of FIG. 4. As shown therein, a motherboard 502 generally comprises the main circuit board of a personal computer processing device. The motherboard 502 contains the connectors 520, 530 for attaching additional boards, such as peripheral controller 600. Typically, the motherboard contains the CPU 540, BIOS, memory 550, 560 mass storage interfaces, serial and parallel ports, expansion slots 520, 530, a battery, 508 and all the controllers and connectors, such as keyboard connector 506 for standard peripheral devices, such as the display screen, keyboard, and disk drive. Also shown in FIG. 5 is PROM device assembly 500 including device 432.

Alternatively, as shown in FIG. 6, PROM device 432 may be provided in a peripheral device such as an expansion card. The expansion card 600 is a printed circuit board that can be inserted into an expansion slot of the motherboard 502 to add additional functionality to a computer system. One edge of the expansion card 600 includes electrical contacts mating with the expansion slots 520, 530 of board 502. PROM 432 may be housed in a socket 504 comprising an in-socket PLCC (Plastic Leaded Chip Carrier) that holds a single PROM IC 432 with 1K Memory. The assembly 500 is used on, for example, the peripheral device 600. Tracking labels 506, 508 may be applied to the exterior of the PROM.

Figure 7:
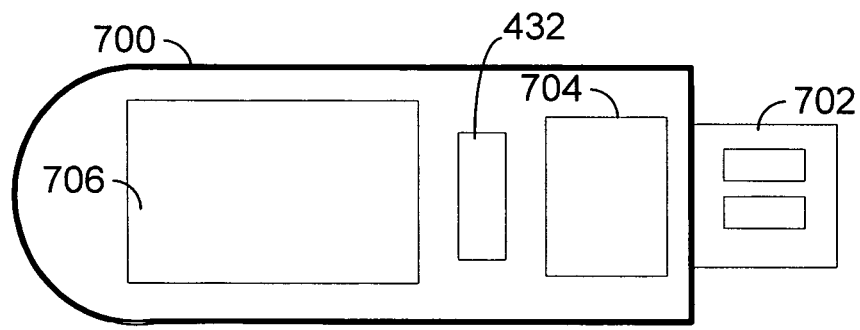
FIG. 7 illustrates a USB memory device configured in accordance with the present invention.

PROM 432 may likewise be provided in a USB key device such as that shown in FIG. 7. A typical key drive 700 includes male type-A USB connector 702 which provides an interface to the host computer. Also shown is USB mass storage controller 704 which implements the USB host controller A flash memory chip (generally NOR or NAND flash memory) 706 stores data. The typical device may also include Jumpers and test pins, LEDs, and a write-protect switch. PROM 432 is provided on the device's circuit board adjacent to the mass storage controller 704. In this instance, the software image in use may itself be stored on the key and linked to the presence of the key device for execution in a processing environment.

Figure 8:
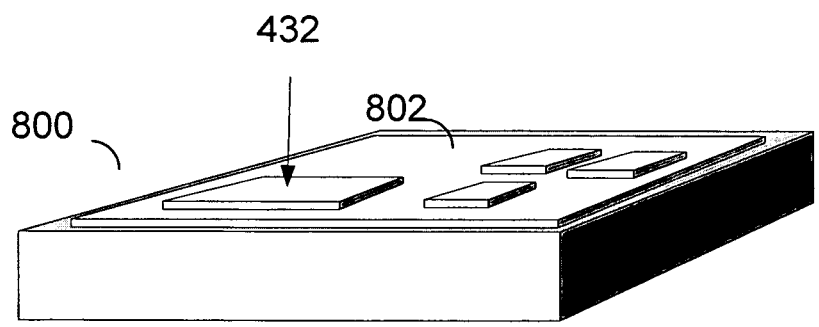
FIG. 8 illustrates a hard disk drive configured in accordance with the present invention.

FIG. 8 shows the PROM 432 device incorporated into a Hard Disk drive 800. A typical hard disk drive 800 consists of storage platters accessed by read-write heads on an armature. Control electronics are provided on a printed circuit board 802 attached to the drive. The associated electronics control the movement of the read-write armature and the rotation of the disk, and perform reads and writes on demand from the disk controller. A hard disk is generally accessed over one of a number of bus types, including ATA (IDE, EIDE), SCSI, FireWire/IEEE 1394, USB, and Fiber Channel, one of which is generally available to a processing device such as that shown in FIG. 4 or 9. PROM 432 may be accessed via this interface by the software manufacturer.

FIG. 9 shows the PROM device utilized in an alternative type or processing device. The device in FIG. 9 is, for example, a set top box for a television or a processing device such as a gaming system. An exemplary configuration of a client 900 is implemented as a broadcast-enabled computer or gaming system. It includes a central processing unit 60 having a processor 62, volatile memory 64 (e.g., RAM), and program memory 66 (e.g., ROM, Flash, disk drive, floppy disk drive, CD-ROM, etc.). The client 900 has one or more input devices 68 (e.g., keyboard, mouse, etc.), a computer display 70 (e.g., VGA, SVGA), and a stereo I/O 72 for interfacing with a stereo system.

The client 900 includes a digital broadcast receiver 74 (e.g., satellite dish receiver, RF receiver, microwave receiver, multicast listener, etc.) and a tuner 76 which tunes to appropriate frequencies or addresses of the broadcast network. The tuner 76 is configured to receive digital broadcast data in a particularized format, such as MPEG-encoded digital video and audio data, as well as digital data in many different forms, including software programs and programming information in the form of data files. The client 900 also has a modem 78 which provides dial-up access to the data network 28 to provide a back channel or direct link to the content servers 22. In other implementations of a back channel, the modem 78 might be replaced by a network card, or an RF receiver, or other type of port/receiver which provides access to the back channel.

The client 900 runs an operating system which supports one specialized application or multiple applications. The operating system is may be a multitasking operating system which allows simultaneous execution of multiple applications. The operating system employs a graphical user interface windowing environment which presents the applications or documents in specially delineated areas of the display screen. The client 900 is illustrated with a key listener 80 to receive the authorization and session keys transmitted from the server. The keys received by listener 80 are used by the cryptographic security services implemented at the client to enable decryption of the session keys and data. Cryptographic services are implemented through a combination of hardware and software. A secure, tamper-resistant hardware unit 82 is provided external to the CPU 60 and two software layers 84, 86 executing on the processor 62 are used to facilitate access to the resources on the cryptographic hardware 82.

The software layers include a cryptographic application program interface (CAPI) 84 which provides functionality to any application seeking cryptographic services (e.g., encryption, decryption, signing, or verification). One or more cryptographic service providers (CSPs) 86 implement the functionality presented by the CAPI to the application. The CAPI layer 84 selects the appropriate CSP for performing the requested cryptographic function. The CSPs 86 perform various cryptographic functions such as encryption key management, encryption/decryption services, hashing routines, digital signing, and authentication tasks in conjunction with the cryptographic unit 82. A different CSP might be configured to handle specific functions, such as encryption, decryption, signing, etc., although a single CSP can be implemented to handle them all. The CSPs 86 can be implemented as dynamic linked libraries (DLLs) that are loaded on demand by the CAPI, and which can then be called by an application through the CAPI 84.

FIG. 10 illustrates a variation on the present invention wherein multiple types of product keys are used for multiple types of software utilized in the system. In the example shown in FIG. 10, two types of product keys are shown—those for exemplary operating system software 1010 and those for application software 1020. Both the operating system software and the application software may be installed by the hardware manufacturer using images, or both may be installed by the end user. In FIG. 10, one type of software is illustrated as installed by the manufacturer from image 442 and the other is illustrated as installed by the end user from image 441. In the example shown in FIG. 10, the method of FIG. 2 is processed identically except that multiple types of keys are stored on the PROM 432. In this context, the keys may be unique for each different type of software. Alternatively, one key may enable all software for the manufacturer.

Still further, the installation of additional software by the end user can be enabled by the product key installed in the hardware ROM 432. Subsequent installations of media from the same software manufacturer 410 may be provided by disk or by a delivery server 1030 of the software manufacturer, and enabled by using the product key or a combination of the hardware product key embedded in the hardware PROM with another product activation key. For example, an end user may download the software from server 1030 and during a valid purchase process, receive an installation key which must be entered at installation. The installation key can be created to work in conjunction with the hardware key in the user's hardware to allow activation of the software. Such a validation algorithm may be based on the unique hardware key in the user's device (446 in FIG. 10) or any valid hardware key for a user device.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for securing software in a hardware device, comprising:

providing a plurality of unique product activation keys, each product activation key of the plurality of unique product activation keys designed to be installed in a read only memory device of a hardware device and each product activation key provided to verify a software application to run on the read only memory device of the hardware device; and encrypting each of the plurality of unique product activation keys;

gathering the plurality of encrypted unique product keys into a key blob;

encrypting the key blob;

delivering the encrypted key blob to a manufacturer of the hardware device.

2. The method for securing software of claim 1 wherein said step of providing includes providing a unique key for each hardware device.

3. The method for securing software of claim 1 wherein said step of providing includes providing a unique key for a set of hardware devices.

4. The method for securing software of claim 1 wherein the step of providing includes providing multiple unique keys for each hardware device.

5. The method for securing software of claim 1 further including the step of supplying the hardware manufacturer with executable software fully operable only when one of the unique product keys associated with the software is accessible to the software via the read only memory in the hardware device.

6. A method of securing software operable on a processing device, comprising:

receiving an encrypted key blob, the encrypted key blob containing a plurality of encrypted unique product activation keys, each product activation key of the plurality of unique product activation keys designed to be installed in a read only memory device of a hardware device and each product activation key provided to verify a software application to run on the read only memory device of the hardware device;

decrypting the encrypted key blob;

decrypting at least one of the plurality of encrypted unique product activation keys;

installing the decrypted unique product activation keys in a read only memory device in the processing device.

7. A method for securing software of claim 6 wherein the step of decrypting each encrypted unique product activation key occurs during said step of installing.

8. The method for securing software of claim 6 wherein said step of decrypting the encrypted key blob requires a security verification process.

9. The method for securing software of claim 6 wherein said step of receiving includes providing a unique key for each processing device.

10. The method for securing software of claim 6 further including the step of installing executable software on the processing device, the software fully operable only when one of the unique product keys associated with the software is accessible to the software via the read only memory accessible in the processing device.

* * * * *